United States Patent Office 3,402,072
Patented Sept. 17, 1968

3,402,072
PREPARATION OF TIN OXIDE RESISTANCES
Bertrand Alain Dreyfus, Sevres, France, assignor to Société d'Electronique et d'Automatisme, Courbevoie, Hauts-de-Seine, France
Filed May 26, 1965, Ser. No. 459,036
Claims priority, application France, June 2, 1964, 976,773
5 Claims. (Cl. 117—201)

ABSTRACT OF THE DISCLOSURE

Preparation of electrical resistances comprising films of tin oxide formed by pyrolysis of tin salt compositions, which otherwise exhibit great dependency of the resistance per square upon manipulative conditions during preparation and unreliability of resistance, can be prepared with high degree of reproducibility of resistance and without extreme controls on production conditions by including in the tin salt mixture which is pyrolyzed to form the tin oxide film a small amount of doping agent which forms an oxide of P-type conductivity.

---

Figure 1:
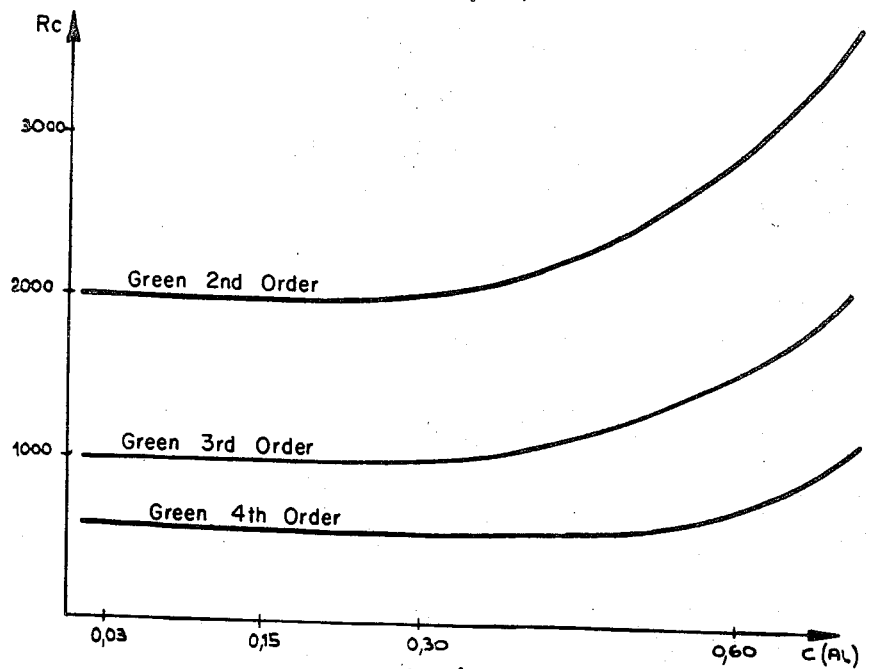

It is established practice in the manufacture of electrical resistances comprising a film of tin oxide to form them by the pyrolitic dissociation on a heated substratum of a mist obtained by the pulverisation of a solution of a tin salt, usually a tin chloride, in water containing an acid such as hydrochloric acid. As known, other metallic salts may be introduced in such solutions for obtaining composite films of several oxides of electrical conductibilities modified with respect to that of the tin oxide alone.

Actually such a method of preparation of such films leads to the obtention of a stannic oxide containing less than the stoichiometric amount of oxygen. As a result of the present invention, it appears that such defaults of stoichiometry play a preponderant part in the determination of the square resistance of the films. It is however very difficult to control the uniformity of such defaults when using such a method. In other words, it is quite difficult to ensure the reproducibility of determined resistance values of the films during a complete course of manufacture. Such difficulties come from the too many parameters to be controlled at the various steps of the manufacture and also to the very difficulty to control some of them with the required accuracy. Not only the rate of impurities must be determined and maintained constant in the initial product, i.e. the tin chloride, for making the solutions, but such solutions vary with the time because, as soon as they are made, reactions occur therein which modify the default of stoichiometry of the solutions in a somewhat haphazardly fashion which does not enable a definite control of the results of such reactions. Variations of conditions during the pulverization step and from one pulverisation to the next one, for instance affecting the pressure and the density of the pulverised mist, the temperature of said mist in its travel to the heated substratum, can also bring substantial changes in the final product and, whereas the temperature of the substratum may be accurately controlled, the conditions of the pyrolitic dissociation proper may be governed by such factors as the impact speed of the drops of the mist and the orientation of the trajectories of the drops in said mist in the neighbourhood of said substratum. Consequently, the reproduction of a result is mainly due to handling capabilities of operators and to more or less fortuitous convergencies of the occurrence of variations leading to stoichiometric defaults substantially constant in the resulting films. One cannot consider that such a manufacture is industrial and adapted to a mass production of the electrical tin oxide resistances.

An object of the invention is to so improve such a general method as above defined that the drawbacks thereof are eliminated.

To this object, it is essentially provided to introduce into the semi-conductor comprising films of tin oxide of the N-type of conductivity, at least one compensating doping impurity the substitution of the metallic atoms to tin atoms in the film tends to the opposite P-type of conductivity. By "doping impurity," it is here understood that such impurity is introduced with a very small proportion in the tin oxide, at a rate equivalent or slightly higher than the rate of normally existing impurities in the basic material, salt or halide, and mainly chloride, of tin from which starts the preparation of the solutions. Usually, for a purified tin chloride, the rate of such a doping impurity will not exceed substantially .05% per weight of the impurity metal to the tin.

The doping impurity is chosen in a group of the general classification of elements lower than Group IV to which tin is a part. According to a further feature of the invention, such impurity is chosen in the group constituted by aluminium, indium, gallium and boron. Applicant has found that with the above mentioned elements, the resistance of the tin oxide film thus doped did not substantially vary for relatively wide fields of concentration of such impurities mainly when, according to a further feature of the invention, such a doping impurity is introduced as an halide or a salt within the solution which is pyrolyzed and which essentially comprises an halide or a salt of tin.

As mentioned above, it was known to introduce metallic halides in the solutions in addition to a tin halide, in view of modifying the resistance values of the oxide film. Nearly all the elements of the classification had been proposed in this respect but it is fundamental to note that such proposed additions have always been rated at several percent proportions, even up to twenty-five percent and more. Actually, this was not made for doping a semiconductor at all but for physically obtaining on a single substratum composite films of several oxides of various elements including tin. The variation of resistance was then obtained solely from the combination of the resistances of the various oxides in such a composite film. The gist and means of the present invention are consequently totally distinct from such prior techniques and films, which did not enable a true reproductibility of the results from film to film.

Figure 2:
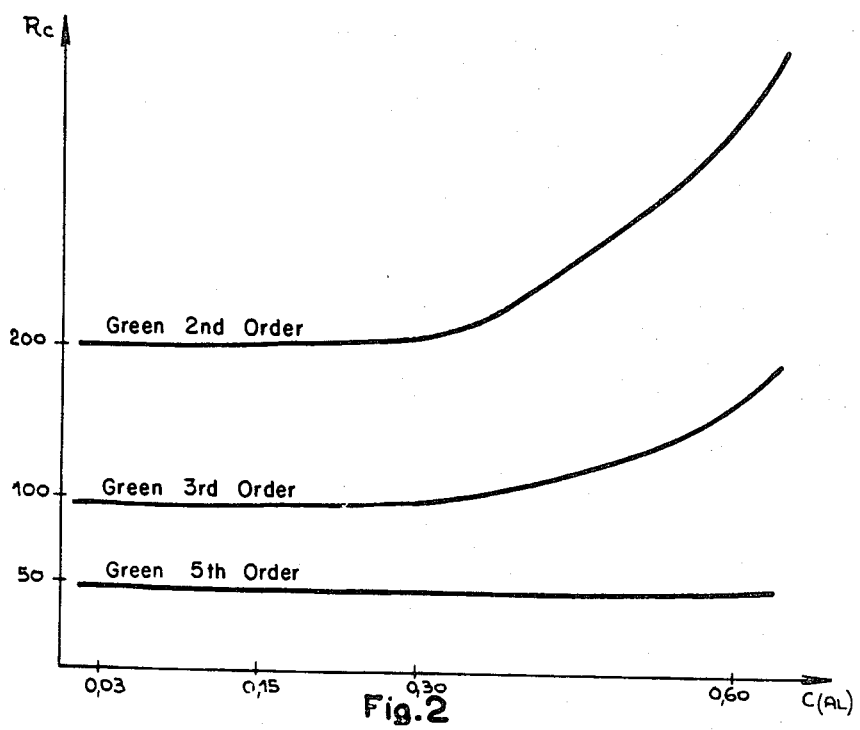

In order to better define the features end results of the reduction to practice of the invention, reference is made to the attached FIGS. 1 and 2. Said figures show curves resulting from various concentrations of doping impurities, with respect to an aluminium impurity (as of low cost and facility of supply). FIG. 1 relates to curves obtained from stanneous chloride and FIG. 2 relates to curves obtained from stannic chloride in the solutions. Whereas the curves substantially show a similar trend, it may be noticed, with reference to the ordinate values, termed in ohms for square resistance of the films, that the solutions containing stanneous chloride result in lower resistances than those of the films from solutions containing stannic chloride. Obviously, different other values can be obtained from proportioning volumes of stanneous and stannic chloride in the solutions.

In both figures however, the abscissae are drawn with the same scale of aluminium concentration, $C_{(AL)}$, and the thicknesses of the films are the same from the corresponding curves of FIG. 1 and FIG. 2. Said thicknesses are as usual defined with reference to the colour and the octave of colour presented by irisation of the films. Illustratively the curves have been selected for the greens of the 2nd, 3rd and 4th orders or ranks.

It may be appreciated that the doping impurity concentrations are quite small for the requested result, the abscissae being termed in grams of aluminium chloride $AlCl_3.6H_2O$ per 100 grams of the tin chloride contained in the solution. As well for the higher resistances, FIG. 1, resulting from a solution of stanneous oxide, as for the lower ones, FIG. 2, resulting from a solution of stannic oxide, it is apparent that, for each thickness of film, there exists a relatively wide zone of values of concentration of doping impurity wherein the resistance value does not vary in an appreciable fashion. The width of such a zone varies for each thickness of the film, but the variation is always directed to an extension as the thickness increases, consequently as the square resistance value of the doped oxide decreases.

The use of another impurity of the above defined group will lead to similar curves. The rates of those other doping impurities will not outpass those of the aluminium.

Illustratively, the oxide films which have been used for obtaining the graphs of FIGS. 1 and 2 have been prepared as follows.

The following basic solutions are prepared:

(a1)

| | |
|---|---|
| $Cl_2Sn2H_2O$ | grams__ 100 |
| Fumming HCl | cc__ 50 |
| Distillated and de-ionised water | cc__ 300 |

(the addition of the water is preferably made just before the utilisation of this solution)

(a2)

| | |
|---|---|
| $Cl_4Sn$ | cc__ 100 |
| Fumming HCl | cc__ 50 |
| Distillated and de-ionised water | cc__ 300 |

(water introduced as for the solution a1)

(A1)

| | |
|---|---|
| $Cl_3Al·6H_2O$ | gr__ 1 |
| Distillated and de-ionised water | litre__ 1 |

(A2)

| | |
|---|---|
| $Cl_3Al·6H_2O$ | gr__ 10 |
| Distillated and de-ionised water | litre__ 1 |

Note: The solution A1 may be obtained from dilution of solution A2.

In producing the semi-conductors, appropriate volumes of such solutions are mixed and the projection is immediately made on the heated substratum. The temperature of such a dielectric substratum is adjusted to 600° C. for the pyrolitic dissociation of the mist obtained from the solution. Preferably, the sprayed mist passes within an oven up to the substratum and the temperature gradient in said oven is maintained as stable as possible by an electric regulation of heating resistors.

It is clear that the addition to a volume of the solution a1 or to a volume of the solution a2 of a volume of A1 or A2 corresponding for the totality of a1 or a2 to 3, 15 or 30 cm.³ of A1, or 15, 30 or 60 cm.³ of A2 is equivalent to the introduction of .003, .015 or .030, respectively, or to the introduction of .15, .30 or .60 gr. of aluminium chloride in the sprayed solution.

What is claimed is:
1. The method of preparing electrical resistances having a high degree of reproducibility of the resistance per square which comprises:
 (a) providing an aqueous solution of tin halide containing another metal halide which forms an oxide having the P-type of conductivity selected from the group consisting of aluminum, indium, gallium and boron, said metal halide being present in the solution in an amount between 0.03 and 0.6 part by weight per 100 parts by weight of tin halide, and
 (b) spraying said aqueous solution of step (a) onto a heated substrate to pyrolitically dissociate the metal halides into metal oxides forming a metal oxide electrical resistance film doped by a P-type conductivity oxide supported on the substrate.

2. A method as claimed in claim 1 wherein the tin halide is tin chloride and the metal halide is aluminium chloride.

3. A method as claimed in claim 1 wherein the metal halide is tin chloride and the metal halide is aluminum to said spraying of the aqueous solution.

4. In the method of preparing electrical resistances by pyrolysis of a tin salt composition containing impurities detrimental to the obtainment of reproducibility of the resistance per square, the step which comprises including in the tin salt composition a doping agent which forms a P-type conductivity oxide in an amount which compensates for the detrimental impurities in the tin salt composition, said amount being between 0.03 and 0.6 part by weight per 100 parts by weight of tin salt.

5. A method as claimed in claim 4 wherein said doping agent is a halide of a metal selected from the group consisting of aluminum, indium, gallium and boron.

References Cited

UNITED STATES PATENTS

| | | | |
|---|---|---|---|
| 2,820,841 | 1/1958 | Carlson | 136—89 |
| 2,919,212 | 12/1959 | Gaiser | 117—211 |
| 3,044,903 | 7/1962 | Skoog | 117—211 |
| 3,050,420 | 8/1962 | Wasserman | 117—211 |
| 3,088,850 | 5/1963 | Brichard | 117—211 |
| 3,107,177 | 10/1963 | Saunders | 117—211 |
| 3,113,039 | 12/1963 | Podzuweit | 117—211 |

WILLIAM L. JARVIS, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,072                          September 17, 1968

Bertrand Alain Dreyfus

It is certified that error appears in the above identified patent and that said Letters Patent are hereby corrected as shown below:

Column 4, line 30, "tin chloride and the metal halide is aluminum" should read -- mixed with the solution of tin halide just prior --.

Signed and sealed this 27th day of January 1970.

(SEAL)
Attest:

Edward M. Fletcher, Jr.                      WILLIAM E. SCHUYLER, JR.
Attesting Officer                              Commissioner of Patents